(12) United States Patent
Hoff et al.

(10) Patent No.: US 12,270,445 B2
(45) Date of Patent: Apr. 8, 2025

(54) WET BRAKE CLUTCH

(71) Applicant: Schaeffler Technologies AG & Co. KG, Herzogenaurach (DE)

(72) Inventors: Austin Hoff, New Franklin, OH (US); Edward Goodwill, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/530,377

(22) Filed: Dec. 6, 2023

(65) Prior Publication Data

US 2024/0318700 A1    Sep. 26, 2024

Related U.S. Application Data

(60) Provisional application No. 63/523,564, filed on Jun. 27, 2023, provisional application No. 63/454,435, filed on Mar. 24, 2023.

(51) Int. Cl.

| | |
|---|---|
| *F16D 13/52* | (2006.01) |
| *F16D 13/72* | (2006.01) |
| *F16D 23/12* | (2006.01) |
| *F16D 25/0638* | (2006.01) |
| *F16D 67/04* | (2006.01) |

(52) U.S. Cl.
CPC .............. *F16D 67/04* (2013.01); *F16D 13/52* (2013.01); *F16D 13/72* (2013.01); *F16D 23/12* (2013.01); *F16D 25/0638* (2013.01); *F16D 2023/123* (2013.01)

(58) Field of Classification Search
CPC ............... F16D 2023/123; F16D 13/52; F16D 25/0638; F16D 48/08; F16D 37/0813; F16D 13/72; B60K 17/165; B60K 7/007
See application file for complete search history.

(56) References Cited

U.S. PATENT DOCUMENTS

| | | | | |
|---|---|---|---|---|
| 4,358,001 A | * | 11/1982 | Iverson | ................... F16D 65/84 188/71.6 |
| 4,562,902 A | * | 1/1986 | Scibbe | ................... B60T 1/062 91/416 |
| 5,562,186 A | * | 10/1996 | Osenbaugh | ............. B60T 1/065 244/50 |

(Continued)

FOREIGN PATENT DOCUMENTS

| | | |
|---|---|---|
| DE | 102018203345 A1 | 9/2019 |
| DE | 102018208975 A1 * | 12/2019 |

(Continued)

*Primary Examiner* — Stacey A Fluhart

(57) ABSTRACT

A braking system for a vehicle includes a clutch. The clutch includes a rotational axis, a clutch housing, arranged to be rotationally fixed relative to the vehicle and sealed to an axle shaft end, a clutch carrier arranged to be rotationally fixed to a first drive portion of the axle shaft end, a clutch pack and a piston for compressing the clutch pack to brake the axle shaft end. The clutch pack includes a first plurality of clutch plates, rotationally fixed to the clutch housing, and a second plurality of clutch plates intermixed with the first plurality of clutch plates and rotationally fixed to the clutch carrier. The clutch may also include a plurality of springs disposed between individual clutch plates of the first plurality of clutch plates, or individual clutch plates of the second plurality of clutch plates.

19 Claims, 6 Drawing Sheets

(56) References Cited

U.S. PATENT DOCUMENTS

| | | | |
|---|---|---|---|
| 6,516,924 B1* | 2/2003 | Michael | F16D 65/853 |
| | | | 188/71.6 |
| 11,117,457 B2 | 9/2021 | Matt | |
| 11,365,768 B2* | 6/2022 | Oezkan | F16D 13/75 |
| 2016/0146267 A1* | 5/2016 | Puck | F16D 13/72 |
| | | | 192/66.3 |
| 2019/0085910 A1* | 3/2019 | Trinkenschuh | F16D 21/08 |
| 2020/0248759 A1* | 8/2020 | Finkenzeller | F16D 13/52 |
| 2021/0270330 A1* | 9/2021 | Hagita | F16D 23/12 |
| 2022/0373084 A1* | 11/2022 | Lienhart | F16D 63/006 |

FOREIGN PATENT DOCUMENTS

| | | |
|---|---|---|
| DE | 102019118659 A1 | 1/2021 |
| DE | 102021205068 A1 | 11/2022 |
| DE | 102021205074 A1 | 11/2022 |

* cited by examiner

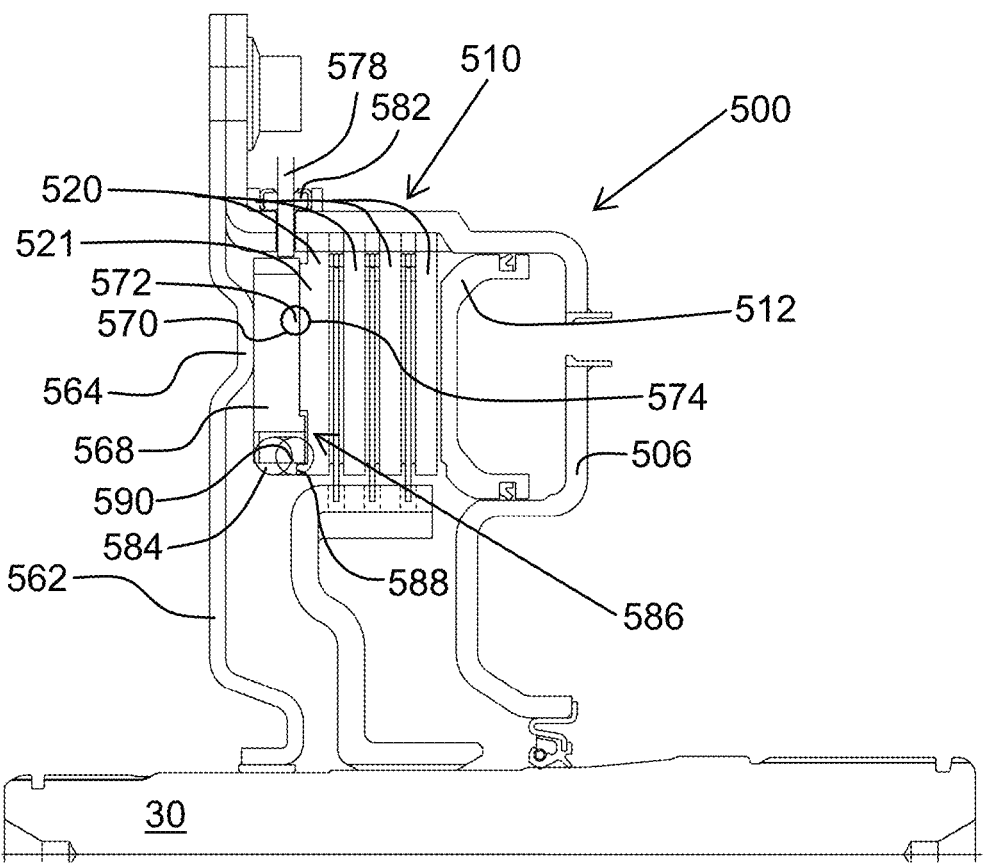
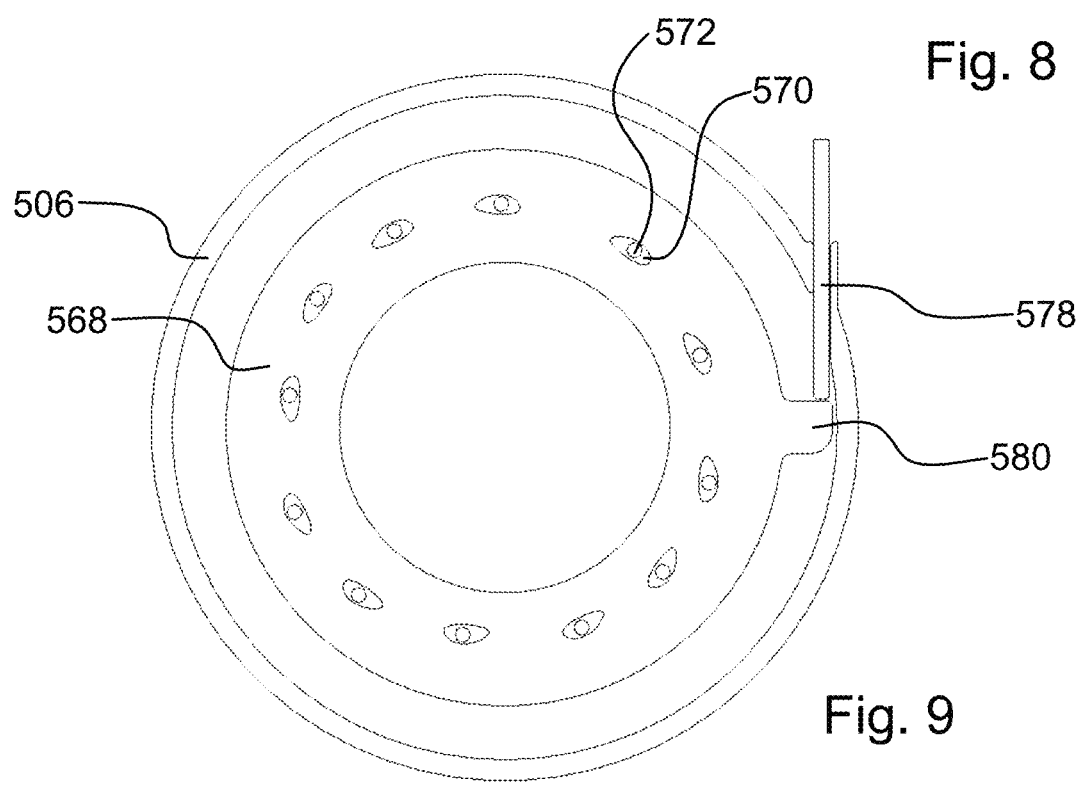
Fig. 8
Fig. 9

WET BRAKE CLUTCH

CROSS-REFERENCE TO RELATED APPLICATIONS

This application claims the benefit of U.S. Provisional Patent Application Nos. 63/454,435, filed Mar. 24, 2023, and 63/523,564, filed Jun. 27, 2023, the disclosures of which are incorporated in their entirety by reference herein.

TECHNICAL FIELD

The present disclosure relates generally to a brake for a vehicle, and more specifically to a wet brake clutch for a vehicle.

BACKGROUND

Brakes for vehicles are known. One example is shown in commonly-assigned German Publication No. DE 10 2019 118 659 A1 titled "Bremsanordnung für einen Radnabenantrieb sowie Radnabenantrieb mit der Bremsanordnung" (Brake arrangement for a wheel hub drive and wheel hub drive with the brake arrangement) to Grauss et al. Other examples are shown in U.S. Pat. No. 11,117,457 B2 titled "AXLE DRIVE UNIT COMPRISINC A BRAKE SYSTEM, DRIVE AXLE AND MOTOR VEHICLE" to Matt, German Publication No. DE 10 2018 203 345 A1 titled "Elektrische Fahrzeugachsenvorrichtung" (Electric vehicle axle device) to Mueller et al., German Publication No. DE 10 2021 205 068 A1 titled "Nachhaltiges Betriebsbremssystem für elektrisch angetriebene Kraftfahrzeuge" (Sustainable service braking system for electrically powered motor vehicles) to Müller-Linkowitsch et al., and German Publication No. DE 10 2021 205 074 A1 titled "Betriebsbremssystem mit wärmegekoppeltem Antrieb von elektrisch angetriebenen Fahrzeugen" (Service brake system with heat-coupled drive of electrically driven vehicles) to Müller-Linkowitsch et al.

SUMMARY

Example aspects broadly comprise a braking system for a vehicle including a clutch. The clutch includes a rotational axis, a clutch housing, arranged to be rotationally fixed relative to the vehicle and sealed to an axle shaft end, a clutch carrier arranged to be rotationally fixed to a first drive portion of the axle shaft end, a clutch pack and a piston for compressing the clutch pack to brake the axle shaft end. The clutch pack includes a first plurality of clutch plates, rotationally fixed to the clutch housing, and a second plurality of clutch plates intermixed with the first plurality of clutch plates and rotationally fixed to the clutch carrier. In an example embodiment, the clutch also includes a plurality of springs disposed between individual clutch plates of the first plurality of clutch plates, or individual clutch plates of the second plurality of clutch plates. In an example embodiment, the clutch carrier is arranged to be rotationally fixed to the first drive portion via a spline connection. In an example embodiment, the clutch carrier is formed in a c-shape and the c-shape has a first tubular portion arranged to be rotationally fixed to the first drive portion, and a second tubular portion, radially outside of the first tubular portion, rotationally fixed to the first plurality of clutch plates.

In some example embodiments, the clutch housing has a toroidal portion at least partially radially aligned with the clutch pack, and the piston is disposed at least partially in the toroidal portion. In an example embodiment, the toroidal portion has an inner circumferential surface and an outer circumferential surface, and the piston is sealed to the inner circumferential surface and the outer circumferential surface. In an example embodiment, the toroidal portion has a fluid port for receiving a pressurized fluid for displacing the piston. In some example embodiments, the braking system includes a cooling port extending axially through the clutch housing radially inside of the clutch pack, and the cooling port has a plurality of radial apertures for directing a cooling fluid towards the clutch pack. In an example embodiment, the braking system has a cooling drain extending through the clutch housing radially outside of the clutch pack for directing the cooling fluid out of the braking system.

In an example embodiment, the braking system includes the axle shaft end with the first drive portion, and a split ring. The first drive portion has a first groove, the clutch carrier has a second groove, and the split ring is disposed in the first groove and the second groove to limit axial displacement of the clutch carrier relative to the axle shaft end. In some example embodiments, the braking system includes the axle shaft end, and the axle shaft end has the first drive portion and a second drive portion, the first drive portion is arranged on a tubular portion of the axle shaft end, and the second drive portion is arranged on a solid, cylindrical portion of the axle shaft end, axially offset from the first drive portion. In an example embodiment, the axle shaft end is a constant velocity (CV) joint housing.

In some example embodiments, the clutch housing has a backing plate with an axially extended portion at an axial side of the clutch pack opposite the piston, and the axially extended portion is arranged for providing a counterforce to the clutch pack when the clutch pack is compressed by the piston. In an example embodiment, the backing plate is arranged for sealing to the axle shaft end. In an example embodiment, the braking system is installed in an axle housing of the vehicle, and the axle housing has an axially extended portion at an axial side of the clutch pack opposite the piston. The axially extended portion is arranged for providing a counterforce to the clutch pack when the clutch pack is compressed by the piston.

Other example aspects broadly comprise an axle assembly for a vehicle including the braking system, the axle shaft end having a second drive portion, the axle housing, and a differential disposed in the axle housing. The second drive portion is rotationally fixed to the differential. In an example embodiment, the axle assembly includes a bearing for supporting the differential in the axle housing. In an example embodiment, the axle assembly includes a pair of braking systems disposed on axially opposite sides of the differential. some example embodiments, the axle assembly includes an axially displaceable parking lock flange rotationally fixed to the axle housing. The axially displaceable parking lock flange includes a first plurality of axially extending teeth, the clutch carrier includes a second plurality of axially extending teeth, and the first plurality of axially extending teeth are arranged to engage the second plurality of axially extending teeth when the axially displaceable parking lock flange is displaced towards the clutch carrier. In an example embodiment, the axle assembly includes an actuator for displacing the axially displaceable parking lock flange towards the clutch carrier.

In some example embodiments, the braking system also includes a ramp reaction plate with a first plurality of ball ramp grooves and a plurality of balls disposed in the first plurality of ball ramp grooves. The piston includes a second plurality of ball ramp grooves, the plurality of balls are disposed in the second plurality of ball ramp grooves, and rotation of the ramp reaction plate is arranged to displace the piston to compress the clutch pack to brake the axle shaft end. In an example embodiment, the piston is rotationally fixed and axially displaceable relative to the clutch housing. In an example embodiment, the clutch housing has an annular surface and the ramp reaction plate contacts the annular surface when the ramp reaction plate is rotated and the piston is displaced.

In some example embodiments, the braking system also includes an actuation bar. The ramp reaction plate has a protrusion and the actuation bar is arranged to displace the protrusion to rotate the ramp reaction plate. In an example embodiment, the actuation bar is sealed to the clutch housing. In an example embodiment, the braking system also includes a retention spring arranged to pull the piston towards the ramp reaction plate when the ramp reaction plate is not rotated. In some example embodiments, the piston has an inset portion arranged for receiving the ramp reaction plate. In an example embodiment the inset portion has a tubular portion and the ramp reaction plate has an inner circumferential surface that is radially positioned by the tubular portion.

In some example embodiments, the braking system also includes a ramp reaction plate with a first plurality of ball ramp grooves and a plurality of balls disposed in the first plurality of ball ramp grooves. A one of the first plurality of clutch plates has a second plurality of ball ramp grooves, the plurality of balls are disposed in the second plurality of ball ramp grooves and rotation of the ramp reaction plate is arranged to displace the one of the first plurality of clutch plates to compress the clutch pack to brake the axle shaft end. In an example embodiment, the clutch housing has a backing plate with an axially extended portion at an axial side of the clutch pack opposite the piston, and the axially extended portion is arranged for providing a counterforce to the ramp reaction plate when the clutch pack is compressed.

In some example embodiments, the braking system also includes an actuation bar. The ramp reaction plate has a protrusion and the actuation bar is arranged to displace the protrusion to rotate the ramp reaction plate. In an example embodiment, the actuation bar is sealed to the clutch housing. In some example embodiments, the braking system also includes a retention spring arranged to pull the one of the first plurality of clutch plates towards the ramp reaction plate when the ramp reaction plate is not rotated. In some example embodiments, the one of the first plurality of clutch plates includes an inset portion arranged for receiving the ramp reaction plate. In an example embodiment, the inset portion has a tubular portion and the ramp reaction plate has an inner circumferential surface that is radially positioned by the tubular portion.

BRIEF DESCRIPTION OF THE DRAWINGS

FIG. 8 illustrates a partial cross-sectional detail view of the braking system of FIG. 1 shown with an alternative embodiment of a parking brake.

FIG. 9 illustrates a front view of a portion of a ball ramp mechanism.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
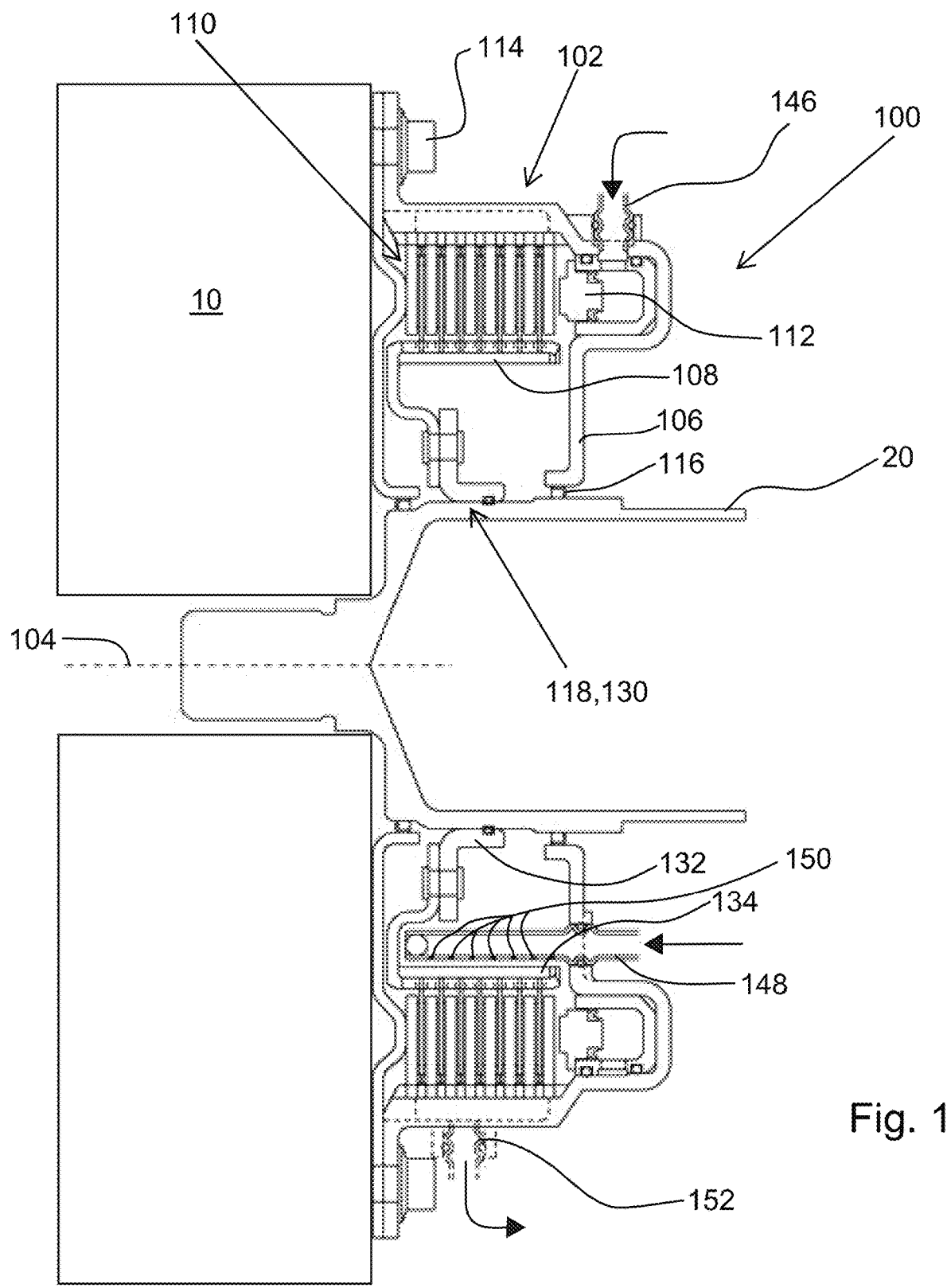
FIG. 1 illustrates a cross-sectional view of a braking system installed in a vehicle.
Figure 2:
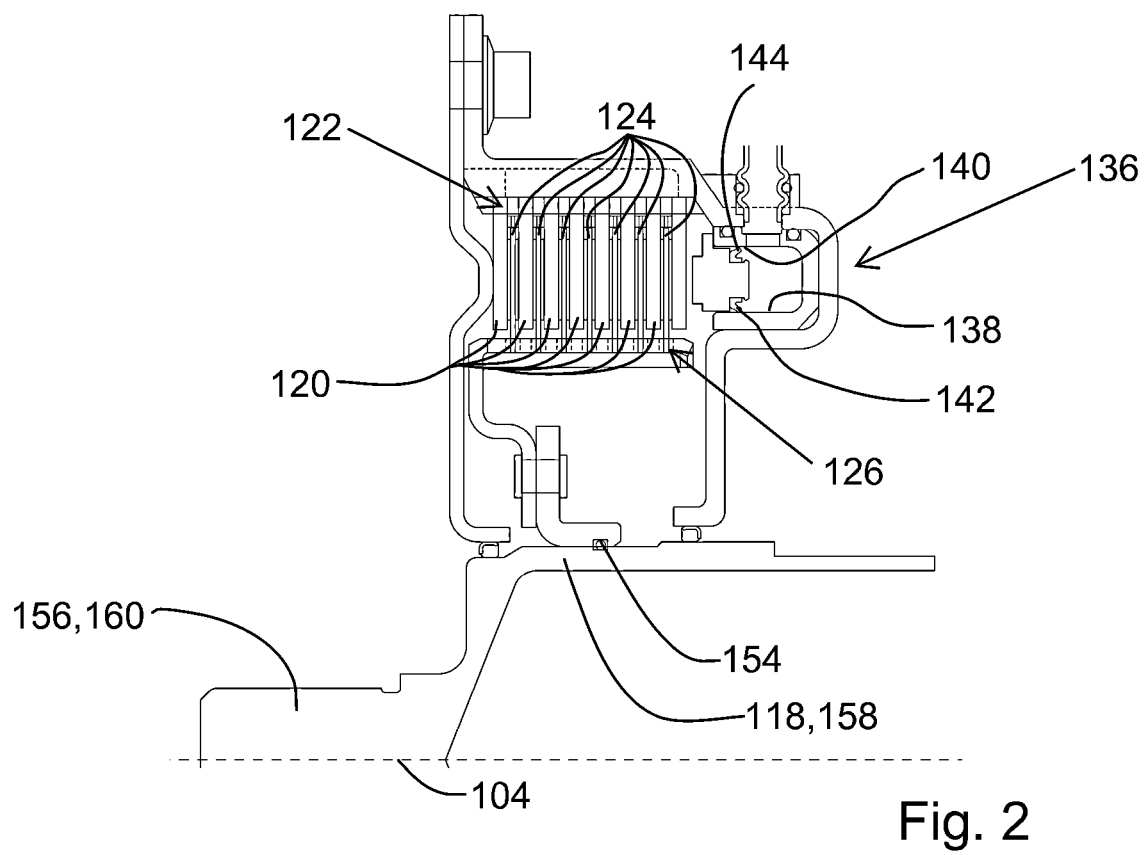
FIG. 2 illustrates a top half cross-sectional detail view of the braking system of FIG. 1.
Figure 3:
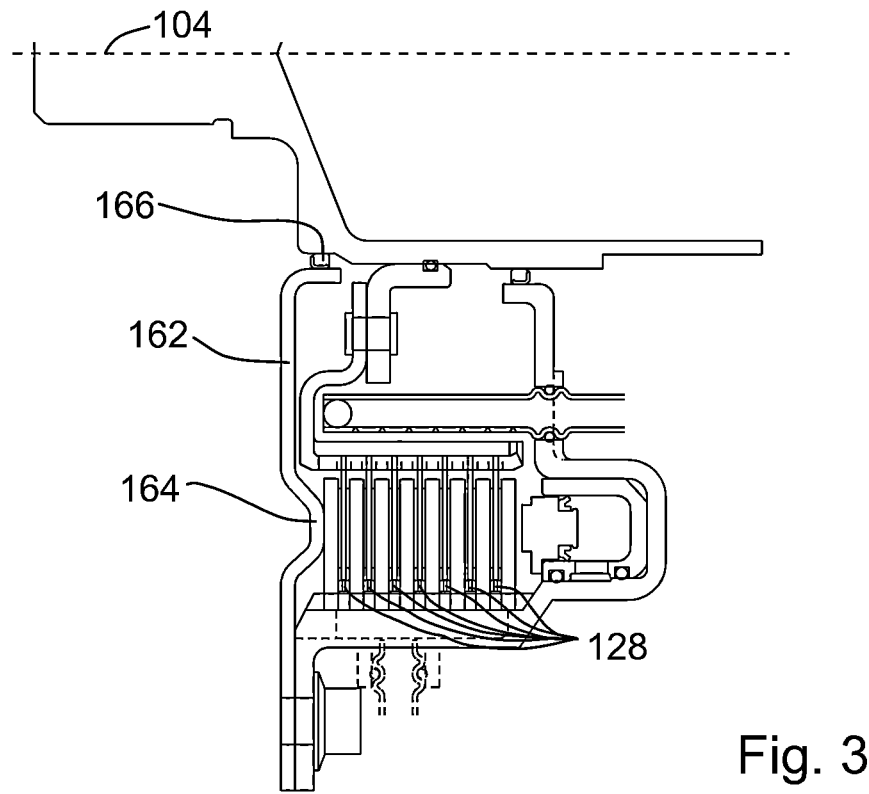
FIG. 3 illustrates a bottom half cross-sectional detail view of the braking system of FIG. 1.

The following description is made with reference to FIGS. 1-3. FIG. 1 illustrates a cross-sectional view of braking system 100 installed in a vehicle including axle components 10 and shaft 20 extending to a wheel (not shown). FIG. 2 illustrates a top half cross-sectional detail view of braking system 100 of FIG. 1. FIG. 3 illustrates a bottom half cross-sectional detail view of braking system 100 of FIG. 1. Braking system 100 for a vehicle (shown partially as axle housing 10 and axle shaft end 20) includes clutch 102 with rotational axis 104, clutch housing 106, clutch carrier 108, clutch pack 110, and piston 112 for compressing the clutch pack to brake the axle shaft end.

The clutch housing is arranged to be rotationally fixed relative to the vehicle (e.g., via bolts 114) and sealed to the axle shaft end (e.g., via seal 116). The clutch carrier is arranged to be rotationally fixed to a first drive portion (e.g., drive portion 118) of the axle shaft end. The clutch pack includes clutch plates 120, rotationally fixed to the clutch housing at tooth connections 122, for example, and clutch plates 124 intermixed with clutch plates 120 and rotationally fixed to the clutch carrier at tooth connections 126, for example. By intermixed, we mean that the clutch pack is assembled with alternating clutch plates 120 and clutch plates 124 so that, except for the axially distal ends, each of clutch plates 120 is between two of clutch plates 124, and vice versa. Clutch plates 120 and 124 may be made of steel and a wet friction material may be bonded to some or all of the plates to prevent steel-on-steel contact in the clutch pack. The wet friction material may be a paper-based friction material, similar to friction materials known from wet clutches in transmissions and launch clutches, for example.

Clutch 102 also includes springs 128 disposed between clutch plates 120. Springs 128 may be wave springs (e.g., a split undulating ring) or Belleville springs (a conical ring), for example. Although springs 128 are shown between clutch plates 120, other embodiments are possible. For example, springs 128 may be disposed between clutch plates 124 alternatively or in addition to clutch plates 120. Springs 128 push the clutch plates away from one another to limit rotational drag between the clutch plates when the clutch is disengaged.

Clutch carrier 108 is arranged to be rotationally fixed to drive portion 118 via a spline connection (e.g., spline connection 130). Clutch carrier 108 is formed in a c-shape including tubular portion 132, arranged to be rotationally fixed to the first drive portion (e.g., at spline connection 130), and tubular portion 134, radially outside of tubular portion 132, rotationally fixed to clutch plates 120 (e.g., at tooth connection 122).

Clutch housing 106 includes toroidal portion 136 at least partially radially aligned with the clutch pack. By at least partially radially aligned we mean that a line extending normal to the radial direction can be drawn that passes through the toroidal portion and the clutch pack. In other words, portions of the toroidal portion and the clutch pack share a common radial dimension. Piston 112 is disposed at least partially in the toroidal portion. Toroidal portion 136 includes inner circumferential surface 138 and outer circumferential surface 140, and piston 112 is to the inner circumferential surface and the outer circumferential surface (at seals 142 and 144, respectively). Toroidal portion 136 includes fluid port 146 for receiving a pressurized fluid for displacing the piston. For example, during a braking event, a vehicle operator may step on a pedal to pressurize fluid in a brake master cylinder (not shown) and that pressurized fluid is provided to the piston via a hydraulic line (not shown) connecting the brake master cylinder to fluid port 146. In an autonomous vehicle, the vehicle operator may be an electrically driven pump or other device that pressurizes the fluid for braking the vehicle. It should also be noted that, in most cases, the pressurized fluid is provided in a sealed system; that is, the pressurized fluid is not mixed with any lubricating fluid or cooling fluid (discussed below) of the axle.

Cooling port 148 extends axially through the clutch housing radially inside of the clutch pack. Cooling port 148 includes radial apertures 150 for directing a cooling fluid towards the clutch pack. That is, cooling fluid exiting apertures 150 is sprayed onto the clutch plates of the clutch pack to remove heat generated in the clutch pack during a braking event, limiting damage to the clutch plates. This cooling fluid may be comparable to an automatic transmission fluid and include friction modifiers for improving performance of the wet friction material and prevent shudder, stick-slip or other undesirable friction characteristics. Cooling drain 152 extends through the clutch housing radially outside of the clutch pack for directing the cooling fluid out of the braking system. That is, once the cooling fluid has passed through the clutch plates, the fluid is removed from the housing to be cooled (e.g., in an oil cooler) and recirculated to the cooling port. As shown in FIG. 1, for example, the cooling port and the cooling drain are located at a radial bottom (e.g., below rotational axis 104) of the clutch housing. This limits an amount of cooling fluid on the clutch plates and reduces drag. For example, housing 106 may be partially full or have no pooled fluid so that the clutch plates do not rotate through the fluid, reducing drag.

Braking system 100 includes axle shaft end 20 and, as discussed above, axle shaft end 20 includes drive portion 118. Braking system 100 also includes split ring 154 disposed in respective grooves in drive portion 118 and clutch carrier 108. Ring 154 limits axial displacement of the clutch carrier relative to the axle shaft end. In other words, ring 154 operates as a sort of detent that, although removable with a firm pull, keeps the clutch carrier in a same axial position on the axle shaft end. Since the axle shaft end is secured in the axle housing and the clutch housing is secured to the axle housing, limited axial motion of the clutch carrier prevents the clutch carrier from contacting the housing during rotation, thereby limiting damage to both components.

Axle shaft end 20 includes drive portions 118 and 156. Drive portion 118 is arranged on tubular portion 158 of the axle shaft end and drive portion 156 is arranged on solid, cylindrical portion 160 of the axle shaft end, axially offset from drive portion 118. As shown in FIG. 1, for example, axle shaft end 20 is a constant velocity (CV) joint housing arranged for receiving components (e.g., balls, cage and inner race) of the CV joint. As will be discussed in more detail below, drive portion 156 may be installed in a vehicle differential of a vehicle axle.

Clutch housing 106 includes backing plate 162 with axially extended portion 164 at an axial side of the clutch pack opposite the piston. The axially extended portion is arranged for providing a counterforce to the clutch pack when the clutch pack is compressed by the piston. In other words, to apply the clutch pack and brake the axle shaft end, the piston applies a force to the clutch pack to close, or engage, the clutch, and the axially extended portion reacts the piston apply force. The backing plate is arranged for sealing to the axle shaft end (e.g., at seal 166). Because the housing and axle shaft form a sealed vessel, the forces are balanced and the overall force from the piston is contained within the housing. In other words, the pressurized fluid applies a force against the housing that is equal to the force applied by the piston, but in the opposite axial direction, and the force from the piston is reacted against the backing plate portion of the housing, opposite the pressure force on the housing, balancing the forces.

Figure 4:
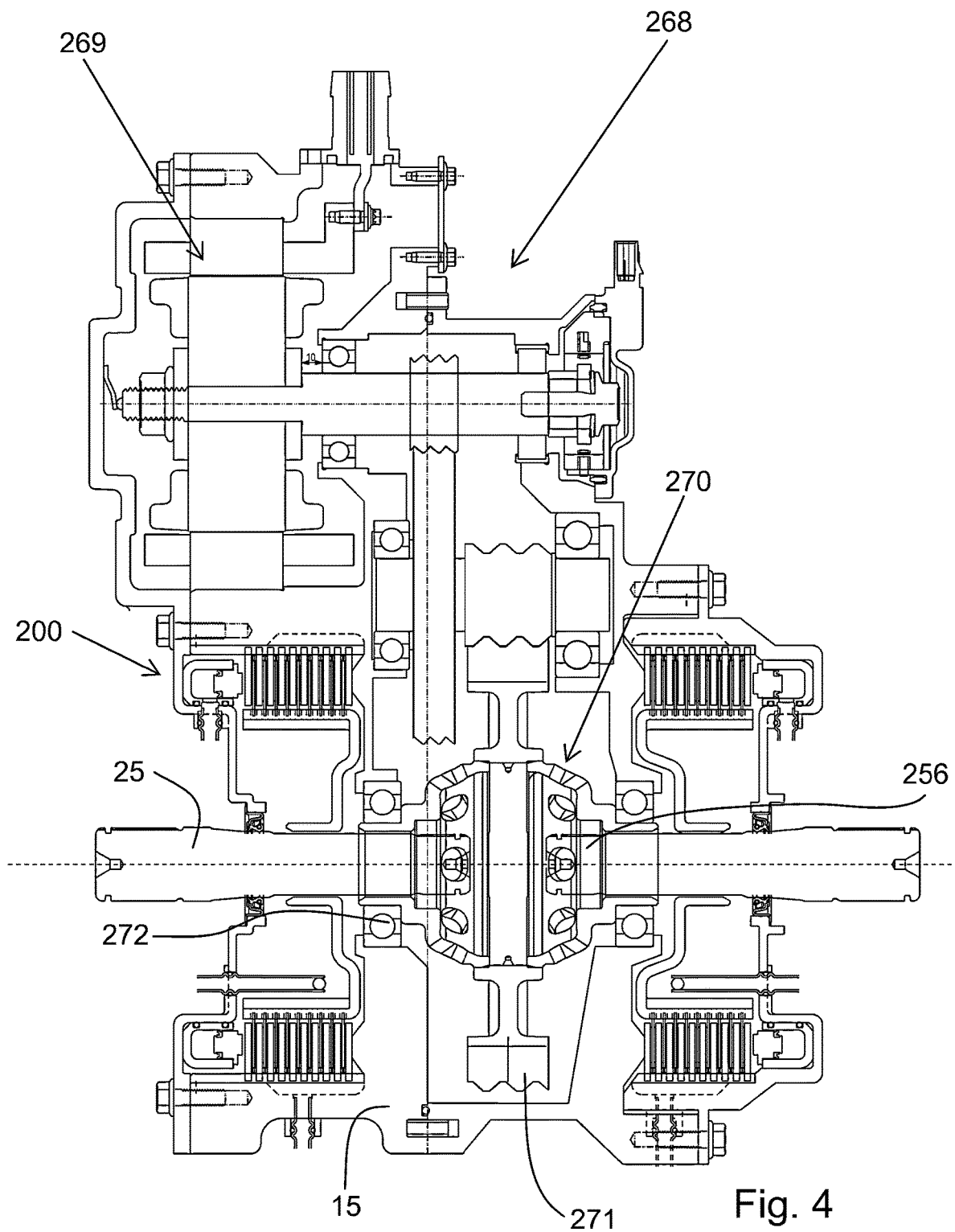
FIG. 4 illustrates a cross-sectional view of a braking system installed in an electric axle.
Figure 5:
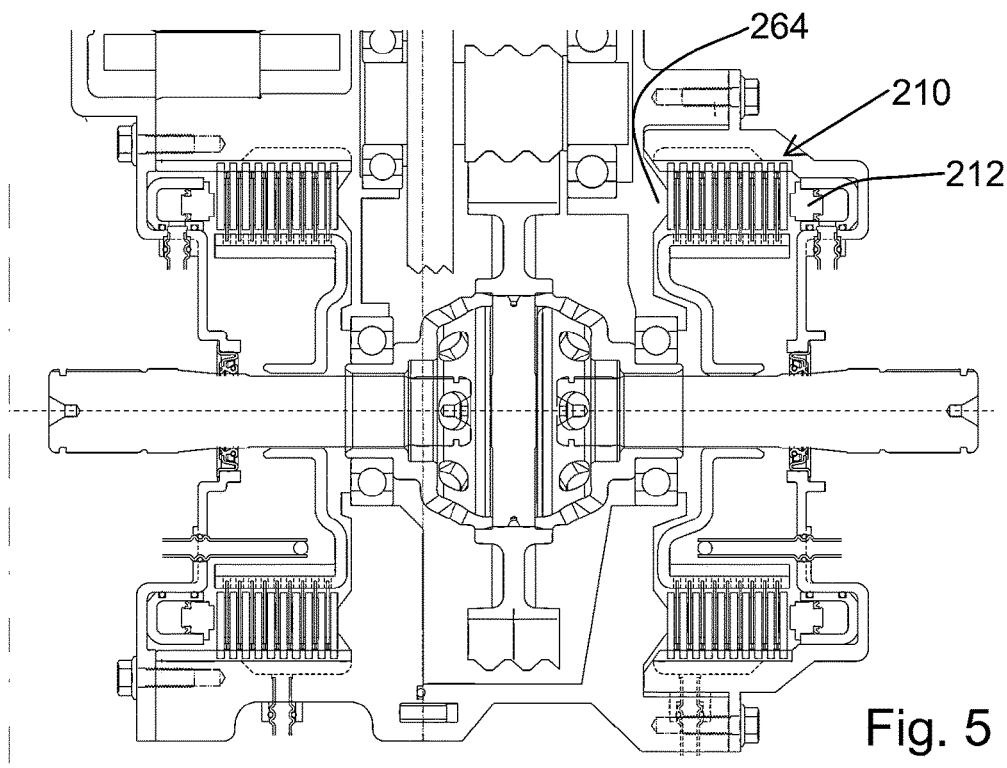
FIG. 5 illustrates a cross-sectional detail view of the braking system of FIG. 4.

The following description is made with reference to FIGS. 4-5. FIG. 4 illustrates a cross-sectional view of braking system 200 installed in electric axle 30. FIG. 5 illustrates a cross-sectional detail view of braking system 200 of FIG. 4. Braking system 200 operates similarly to braking system 100 discussed above so the common functions will not be discussed here. Elements labeled with 2XX reference numbers operate in a same manner as elements labeled with 1XX reference numbers described above, except as discussed below.

Braking system 200 is installed in an axle housing 15 of a vehicle. The axle housing includes axially extended portion 264 at an axial side of clutch pack 210 opposite piston 212. Axially extended portion 264 is arranged for providing a counterforce to the clutch pack when the clutch pack is compressed by the piston, similar to axially extended portion 164 discussed above. In the embodiment shown in FIG. 4, clutch housing 206 also forms a cover for electric drive motor 269.

Axle assembly 268 includes braking system 200, axle shaft end 25 including drive portion 256, axle housing 15 and differential 270 disposed in the axle housing. Drive portion 256 is rotationally fixed to the differential. Differential 270 may be any differential used for vehicle axles. For example, differential 270 may be an open differential including side gears or spider gears, or a limited slip differential including clutch packs or hypoid gears. Differential 270 includes drive gear 271 for receiving torque from electric drive motor 269 to propel the vehicle.

Axle assembly 268 also includes bearing 272 for supporting the differential in the axle housing. As shown in the figures, axle assembly 268 includes a pair of braking systems 200 disposed on axially opposite sides of the differential. That is, each axle shaft end 25 provides a drive torque to a vehicle wheel (not shown) and respective braking systems 200 brake the axle shaft ends to slow the vehicle. Since there is a separate braking system for each wheel, safety features such as anti-lock braking systems (ABS) may be used with axle assembly 268 to control skidding of individual wheels during hard braking or slippery conditions, for example.

Figure 6:
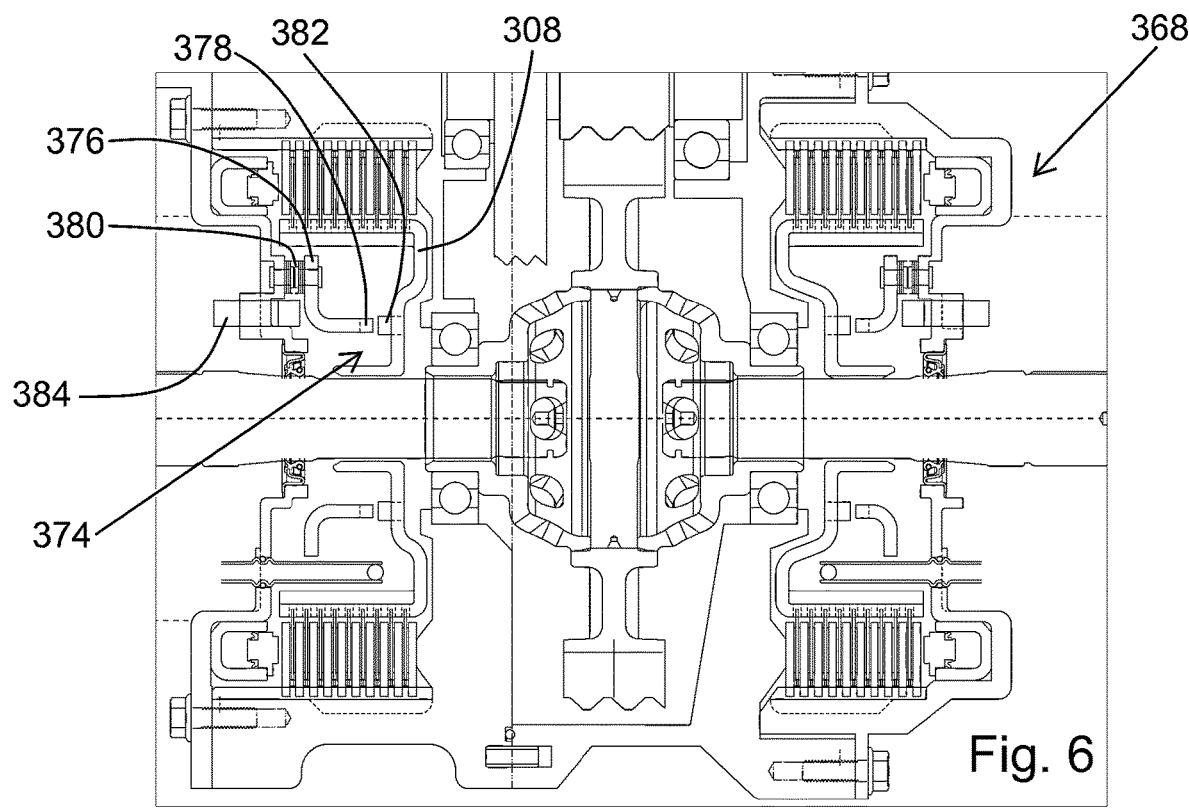
FIG. 6 illustrates a cross-sectional detail view of an alternative embodiment of the braking system of FIG. 4 shown with a parking brake.

The following description is made with reference to FIG. 6. FIG. 6 illustrates a cross-sectional detail view of an alternative embodiment of braking system 200 of FIG. 4 shown with parking brake 374. Similar to the discussion above, elements labeled with 3XX reference numbers operate in a same manner as elements labeled with 1XX or 2XX reference numbers, except as discussed below. Axle assembly 368 includes axially displaceable parking lock flange 376 rotationally fixed to axle housing 15 with axially extending teeth 378. The flange may be attached to the axle housing via leaf springs 380, for example, that permit axial displacement of the flange but restrict rotational motion. Similarly, clutch carrier 308 includes axially extending teeth 382. Axially extending teeth 378 are arranged to engage axially extending teeth 382 when axially displaceable parking lock flange 376 is displaced towards the clutch carrier. Axle assembly 368 also includes actuator 384 for displacing the axially displaceable parking lock flange towards the clutch carrier. Actuator 384 may be electrically or hydraulically operated, or manually operated by a cable (not shown) extending to a handle in a passenger compartment of the vehicle, for example.

Figure 7:
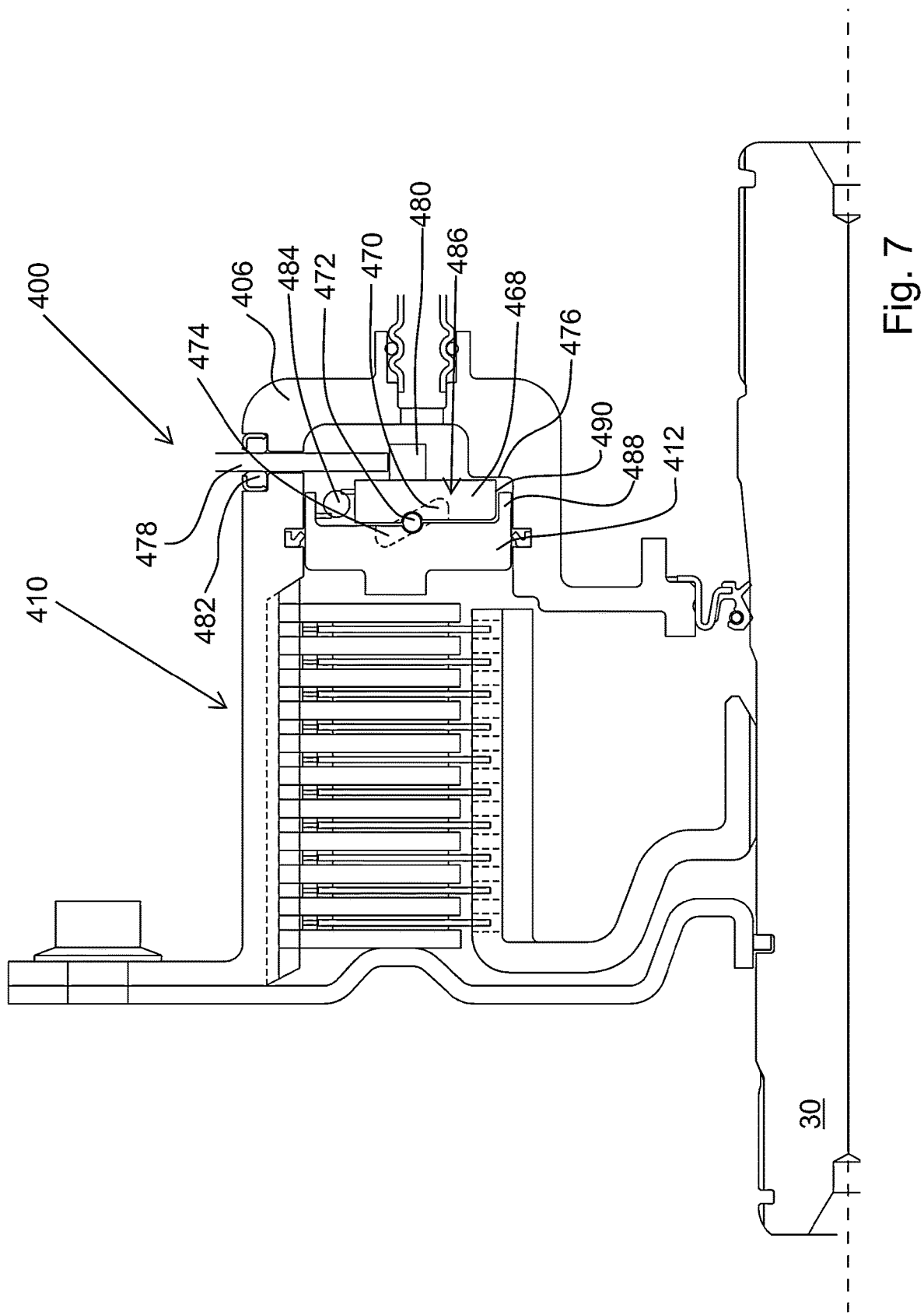
FIG. 7 illustrates a partial cross-sectional detail view of the braking system of FIG. 1 shown with an alternative embodiment of a parking brake.

The following description is made with reference to FIG. 7. FIG. 7 illustrates a partial cross-sectional detail view of the braking system of FIG. 1 shown with an alternative embodiment of a parking brake. Braking system 400 generally operates similarly to braking system 100 described above and 4XX reference numbers generally correspond with 1XX reference numbers described above, except as described below. Braking system 400 includes ramp reaction plate 468 with ball ramp grooves 470, and balls, or bearings, 472 disposed in ball ramp grooves 470. Piston 412 includes ball ramp grooves 474 and balls 472 are disposed in ball ramp grooves 474. In other words, a ball ramp feature is added to the backside of the piston. Rotation of the ramp reaction plate is arranged to displace the piston to compress clutch pack 410 to brake axle shaft end 30. Piston 412 is rotationally fixed and axially displaceable relative to clutch housing 406. Clutch housing 406 includes annular surface 476 and the ramp reaction plate contacts the annular surface when the ramp reaction plate is rotated and the piston is displaced. Otherwise stated, as the reaction plate rotates and the piston is held rotationally stationary, the bearings follow the ramp profile, creating an axial movement of the piston. The reaction plate is limited in axial movement due to a travel stop (e.g., surface 476) with the clutch housing. This causes the piston to move to the left as viewed in FIG. 7, for example, to compress, or clamp, the clutch pack.

Braking system 400 also includes actuation bar 478. The ramp reaction plate includes protrusion, or tab, 480 and the actuation bar is arranged to displace the protrusion to rotate the ramp reaction plate. That is, the actuation bar pushes on a tab on the ramp reaction plate resulting in a torque and rotational movement of the plate. The actuator bar connects the internal components (e.g., ramp reaction plate 468) to external actuator components (not shown). The actuation bar may be electrically or hydraulically operated, or manually operated by a cable (not shown) extending to a handle in a passenger compartment of the vehicle, for example, similar to actuator 384 described above. Actuation bar 478 is sealed to the clutch housing at seal 482, for example.

Braking system 400 also includes retention spring 484 arranged to pull the piston towards the ramp reaction plate when the ramp reaction plate is not rotated. That is, the piston and reaction plate are axially held together by retention spring 484. Piston 412 includes inset portion 486 arranged for receiving the ramp reaction plate. The inset portion includes tubular portion 488 and the ramp reaction plate includes inner circumferential surface 490 that is radially positioned by the tubular portion. In other words, the reaction plate is centered within the piston.

The following description is made with reference to FIGS. 8-9. FIG. 8 illustrates a partial cross-sectional detail view of the braking system of FIG. 1 shown with an alternative embodiment of a parking brake. FIG. 9 illustrates a front view of a portion of a ball ramp mechanism. Braking system 500 generally operates similarly to braking systems 100 and 400 described above and 5XX reference numbers generally correspond with 1XX and 4XX reference numbers described above, except as described below. Braking system 500 includes ramp reaction plate 568 with ball ramp grooves 570, and balls 572 disposed in ball ramp grooves 570. One of clutch plates 520 (e.g., clutch plate 521) includes ball ramp grooves 574 and balls 572 are disposed in ball ramp grooves 574. Rotation of the ramp reaction plate is arranged to displace clutch plate 521 to compress clutch pack 510 to brake axle shaft end 30. Clutch housing 506 includes backing plate 564 with axially extended portion 568 at an axial side of the clutch pack opposite the piston, and the axially extended portion is arranged for providing a counterforce to the ramp reaction plate when the clutch pack is compressed. Axial displacement of piston 512 away from the ramp reaction plate is restricted by contact with clutch housing 506 when the clutch pack is compressed.

Braking system 500 also includes actuation bar 578. The ramp reaction plate includes protrusion, or tab, 580 and the actuation bar is arranged to displace the protrusion to rotate the ramp reaction plate. That is, the actuation bar pushes on a tab on the ramp reaction plate resulting in a torque and rotational movement of the plate. The actuator bar connects the internal components (e.g., ramp reaction plate 568) to external actuator components (not shown). The actuation bar may be electrically or hydraulically operated, or manually operated by a cable (not shown) extending to a handle in a passenger compartment of the vehicle, for example, similar to actuator 384 described above. Actuation bar 578 is sealed to the clutch housing at seal 582, for example.

Braking system 500 also includes retention spring 584 arranged to pull the clutch plate towards the ramp reaction plate when the ramp reaction plate is not rotated. That is, the clutch plate and reaction plate are axially held together by retention spring 584. Clutch plate 521 includes inset portion 586 arranged for receiving the ramp reaction plate. The inset portion includes tubular portion 588 and the ramp reaction plate includes inner circumferential surface 590 that is radially positioned by the tubular portion. In other words, the reaction plate is centered within the clutch plate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

- 10 Axle housing
- 15 Axle housing
- 20 Axle shaft end
- 25 Axle shaft end
- 30 Axle shaft end
- 100 Braking system
- 102 Clutch
- 104 Rotational axis
- 106 Clutch housing
- 108 Clutch carrier
- 110 Clutch pack
- 112 Piston
- 114 Bolts (clutch housing to vehicle)
- 116 Seal (clutch housing to axle shaft end)
- 118 Drive portion (first)
- 120 Clutch plates (first)
- 122 Tooth connection (first clutch plates)
- 124 Clutch plates (second)
- 126 Tooth connection (second clutch plates)
- 128 Springs
- 130 Spline connection (carrier to first drive portion)
- 132 Tubular portion (first)
- 134 Tubular portion (second)
- 136 Toroidal portion
- 138 Inner circumferential surface
- 140 Outer circumferential surface
- 142 Seal (piston to inner circumferential surface)
- 144 Seal (piston to outer circumferential surface)
- 146 Fluid port (pressurized fluid)
- 148 Cooling port
- 150 Radial apertures (cooling port)
- 152 Cooling drain
- 154 Split ring
- 156 Drive portion (second)
- 158 Tubular portion (axle shaft end)
- 160 Solid, cylindrical portion (axle shaft end)
- 162 Backing plate (clutch housing)
- 164 Axially extended portion (backing plate)
- 166 Seal (backing plate to axle shaft housing)
- 200 Braking system
- 210 Clutch pack
- 212 Piston
- 256 Drive portion (second)
- 264 Axially extended portion (axle housing)
- 268 Axle assembly
- 269 Electric drive motor
- 270 Differential
- 271 Drive gear
- 272 Bearing
- 308 Clutch carrier
- 368 Axle assembly
- 374 Parking brake
- 376 Axially displaceable parking lock flange
- 378 Axially extending teeth (first)
- 380 Leaf springs
- 382 Axially extending teeth (second)
- 384 Actuator
- 400 Braking system
- 406 Clutch housing
- 410 Clutch pack
- 412 Piston
- 468 Ramp reaction plate
- 470 Ball ramp grooves (ramp reaction plate)
- 472 Balls, or bearings
- 474 Ball ramp grooves (piston)
- 476 Annular surface (clutch housing)
- 478 Actuation bar
- 480 Protrusion, or tab (ramp reaction plate)
- 482 Seal (actuation bar to clutch housing)
- 484 Retention springs
- 486 Inset portion (piston)
- 488 Tubular portion (inset portion)
- 490 Inner circumferential surface (ramp reaction plate)
- 500 Braking system
- 506 Clutch housing
- 510 Clutch pack
- 512 Piston
- 520 Clutch plates (first)
- 521 Clutch plate (one of clutch plates 520)
- 562 Backing plate (clutch housing)
- 564 Axially extended portion (backing plate)
- 568 Ramp reaction plate
- 570 Ball ramp grooves (ramp reaction plate)
- 572 Balls
- 574 Ball ramp grooves (clutch plate)
- 578 Actuation bar
- 580 Protrusion, or tab (ramp reaction plate)
- 582 Seal (actuation bar to clutch housing)
- 584 Retention springs
- 586 Inset portion (clutch plate)
- 588 Tubular portion (inset portion)
- 590 Inner circumferential surface (ramp reaction plate)

What is claimed is:

1. A braking system for a vehicle, comprising a clutch, the clutch comprising:
a rotational axis;
a clutch housing, arranged to be rotationally fixed relative to the vehicle and sealed to an axle shaft end;

a clutch carrier arranged to be rotationally fixed to a first drive portion of the axle shaft end;
a clutch pack comprising:
a first plurality of clutch plates, rotationally fixed to the clutch housing; and
a second plurality of clutch plates intermixed with the first plurality of clutch plates and rotationally fixed to the clutch carrier; and
a piston for compressing the clutch pack to brake the axle shaft end, wherein:
the braking system is installed in an axle housing of the vehicle; and
the axle housing comprises an axially extended portion at an axial side of the clutch pack opposite the piston, the axially extended portion arranged for providing a counterforce to the clutch pack when the clutch pack is compressed by the piston.

2. The braking system of claim 1 wherein the clutch carrier is formed in a c-shape, the c-shape comprising:
a first tubular portion arranged to be rotationally fixed to the first drive portion; and
a second tubular portion, radially outside of the first tubular portion, rotationally fixed to the second plurality of clutch plates.

3. The braking system of claim 1 wherein:
the clutch housing comprises a toroidal portion at least partially radially aligned with the clutch pack; and
the piston is disposed at least partially in the toroidal portion.

4. The braking system of claim 3 wherein:
the toroidal portion comprises an inner circumferential surface and an outer circumferential surface; and
the piston is sealed to the inner circumferential surface and the outer circumferential surface.

5. The braking system of claim 1 further comprising a cooling port extending axially through the clutch housing radially inside of the clutch pack, the cooling port comprising a plurality of radial apertures for directing a cooling fluid towards the clutch pack.

6. The braking system of claim 5 further comprising a cooling drain extending through the clutch housing radially outside of the clutch pack for directing the cooling fluid out of the braking system.

7. The braking system of claim 1 further comprising the axle shaft end, wherein:
the axle shaft end comprises the first drive portion and a second drive portion;
the first drive portion is arranged on a tubular portion of the axle shaft end; and
the second drive portion is arranged on a solid, cylindrical portion of the axle shaft end, axially offset from the first drive portion.

8. The braking system of claim 7 wherein the axle shaft end is a constant velocity (CV) joint housing.

9. The braking system of claim 1 wherein the clutch housing comprises a backing plate with an axially extended portion at an axial side of the clutch pack opposite the piston, the clutch housing axially extended portion arranged for providing the counterforce to the clutch pack when the clutch pack is compressed by the piston.

10. An axle assembly for a vehicle comprising:
the braking system of claim 1;
the axle shaft end comprising a second drive portion;
the axle housing; and
a differential disposed in the axle housing, wherein the second drive portion is rotationally fixed to the differential.

11. The axle assembly of claim 10 further comprising an axially displaceable parking lock flange rotationally fixed to the axle housing and comprising a first plurality of axially extending teeth, wherein the clutch carrier comprises a second plurality of axially extending teeth and the first plurality of axially extending teeth are arranged to engage the second plurality of axially extending teeth when the axially displaceable parking lock flange is displaced towards the clutch carrier.

12. The braking system of claim 1 further comprising:
a ramp reaction plate comprising a first plurality of ball ramp grooves; and
a plurality of balls disposed in the first plurality of ball ramp grooves, wherein:
the piston comprises a second plurality of ball ramp grooves;
the plurality of balls are disposed in the second plurality of ball ramp grooves; and
rotation of the ramp reaction plate is arranged to displace the piston to compress the clutch pack to brake the axle shaft end.

13. The braking system of claim 12 further comprising an actuation bar, wherein:
the ramp reaction plate comprises a protrusion; and
the actuation bar is arranged to displace the protrusion to rotate the ramp reaction plate.

14. The braking system of claim 12 wherein the piston comprises an inset portion arranged for receiving the ramp reaction plate.

15. The braking system of claim 1 further comprising:
a ramp reaction plate comprising a first plurality of ball ramp grooves; and
a plurality of balls disposed in the first plurality of ball ramp grooves, wherein:
a one of the first plurality of clutch plates comprises a second plurality of ball ramp grooves;
the plurality of balls are disposed in the second plurality of ball ramp grooves; and
rotation of the ramp reaction plate is arranged to displace the one of the first plurality of clutch plates to compress the clutch pack to brake the axle shaft end.

16. The braking system of claim 15 wherein the clutch housing comprises a backing plate with an axially extended portion at an axial side of the clutch pack opposite the piston, the clutch housing axially extended portion arranged for providing a counterforce to the ramp reaction plate when the clutch pack is compressed.

17. The braking system of claim 15 further comprising an actuation bar, wherein:
the ramp reaction plate comprises a protrusion; and
the actuation bar is arranged to displace the protrusion to rotate the ramp reaction plate.

18. A braking system for a vehicle, comprising a clutch, the clutch comprising:
a rotational axis;
a clutch housing, arranged to be rotationally fixed relative to the vehicle and sealed to an axle shaft end;
a clutch carrier arranged to be rotationally fixed to a first drive portion of the axle shaft end;
a clutch pack comprising:
a first plurality of clutch plates, rotationally fixed to the clutch housing; and
a second plurality of clutch plates intermixed with the first plurality of clutch plates and rotationally fixed to the clutch carrier; and a piston for compressing the clutch pack to brake the axle shaft end;
a ramp reaction plate comprising a first plurality of ball ramp grooves; and
a plurality of balls disposed in the first plurality of ball ramp grooves, wherein:
 the piston comprises a second plurality of ball ramp grooves;
 the plurality of balls are disposed in the second plurality of ball ramp grooves; and
 rotation of the ramp reaction plate is arranged to displace the piston to compress the clutch pack to brake the axle shaft end;
 the clutch housing comprises an annular surface; and
 the ramp reaction plate contacts the annular surface when the ramp reaction plate is rotated and the piston is displaced.

19. A braking system for a vehicle, comprising a clutch, the clutch comprising:
a rotational axis;
a clutch housing, arranged to be rotationally fixed relative to the vehicle and sealed to an axle shaft end;
a clutch carrier arranged to be rotationally fixed to a first drive portion of the axle shaft end;
a clutch pack comprising:
 a first plurality of clutch plates, rotationally fixed to the clutch housing; and
 a second plurality of clutch plates intermixed with the first plurality of clutch plates and rotationally fixed to the clutch carrier; and
 a piston for compressing the clutch pack to brake the axle shaft end;
a ramp reaction plate comprising a first plurality of ball ramp grooves;
a plurality of balls disposed in the first plurality of ball ramp grooves; and
a retention spring arranged to pull the one of the first plurality of clutch plates towards the ramp reaction plate when the ramp reaction plate is not rotated, wherein:
 the piston comprises a second plurality of ball ramp grooves;
 the plurality of balls are disposed in the second plurality of ball ramp grooves; and
 rotation of the ramp reaction plate is arranged to displace the piston to compress the clutch pack to brake the axle shaft end.

* * * * *